US006581621B1

United States Patent
Klaffki et al.

(10) Patent No.: US 6,581,621 B1
(45) Date of Patent: Jun. 24, 2003

(54) VALVE AND FUEL TANK PROVIDED WITH A VALVE FOR A MOTOR VEHICLE

(75) Inventors: Heinz Klaffki, Unterschleissheim (DE); Marietta Gehring, Anzing (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 148 days.

(21) Appl. No.: 09/890,059

(22) PCT Filed: Nov. 3, 2000

(86) PCT No.: PCT/EP00/10864

§ 371 (c)(1),
(2), (4) Date: Nov. 13, 2001

(87) PCT Pub. No.: WO01/38118

PCT Pub. Date: May 31, 2001

(30) Foreign Application Priority Data

Nov. 26, 1999  (DE) .......................................... 199 56 932

(51) Int. Cl.⁷ ......................... B60K 15/035; F16K 24/04
(52) U.S. Cl. ......................... 137/43; 137/202; 137/434; 137/630; 137/630.22; 123/516; 220/746
(58) Field of Search .......................... 137/43, 202, 434, 137/442, 444, 445, 630, 630.22; 123/516; 220/746

(56) References Cited

U.S. PATENT DOCUMENTS

| | | | |
|---|---|---|---|
| 3,548,847 A | 12/1970 | Roven | 137/43 |
| 5,119,790 A | 6/1992 | Olson | 123/516 |
| 5,313,977 A | 5/1994 | Bergsma et al. | 137/43 |
| 5,386,844 A * | 2/1995 | Kennedy | 137/202 |
| 5,392,804 A * | 2/1995 | Kondo et al. | 137/202 |
| 5,439,023 A * | 8/1995 | Horikawa | 137/630.15 |
| 5,687,756 A * | 11/1997 | VanNatta et al. | 137/202 |
| 5,860,458 A * | 1/1999 | Benjey et al. | 137/43 |
| 5,960,817 A | 10/1999 | Johansen et al. | 137/202 |
| 5,983,958 A | 11/1999 | Bergsma et al. | 141/59 |
| 6,062,250 A | 5/2000 | Takahashi | 137/202 |

FOREIGN PATENT DOCUMENTS

| | | |
|---|---|---|
| DE | 2019 082 | 11/1970 |
| DE | 33 42 871 A1 | 6/1985 |
| DE | 3417 507 C2 | 11/1985 |
| DE | 195 40 267 A1 | 4/1997 |
| DE | 198 50 662 A1 | 5/1999 |
| EP | 0 763 441 A2 | 3/1997 |
| EP | 0 869 022 A2 | 10/1998 |
| FR | 2 686 840 | 8/1993 |
| WO | WO 99/16633 * | 4/1999 |

OTHER PUBLICATIONS

International Search Report for PCT/EP 00/10864 (dated Mar. 22, 2001).

* cited by examiner

Primary Examiner—Michael Powell Buiz
Assistant Examiner—Ramesh Krishnamurthy
(74) Attorney, Agent, or Firm—Crowell & Moring LLP

(57) ABSTRACT

The invention relates to a valve and a fuel tank provided with a valve for a motor vehicle. Bleeder valves for integrated compensation volumes for fuel tanks are known in the prior art. One disadvantage of known valves is that if the tank is filled slowly during the refueling operation, the fuel compensation volume can fill. The invention aims to provide a valve with a compact construction. To this end a pressure valve (28) is located on the valve (1, 3) which opens if there is a predetermined excess pressure in the fuel tank (30), a refueling venting opening (38) is configured in the valve (1, 3) so that a sealing plate (5) can close the refueling venting opening. The sealing plate (5) has an operational venting opening (42), which can be closed by a displaceable closure element (15) that is displaced according to a position of a float (26) that is located on a float lever (24).

46 Claims, 4 Drawing Sheets

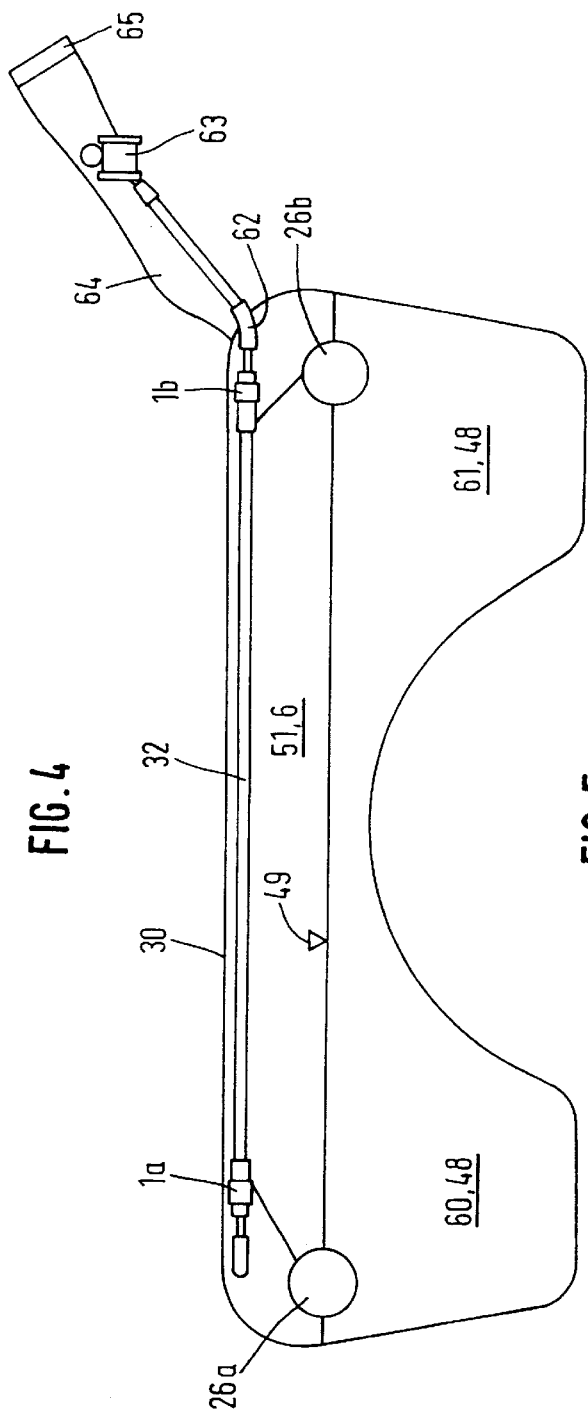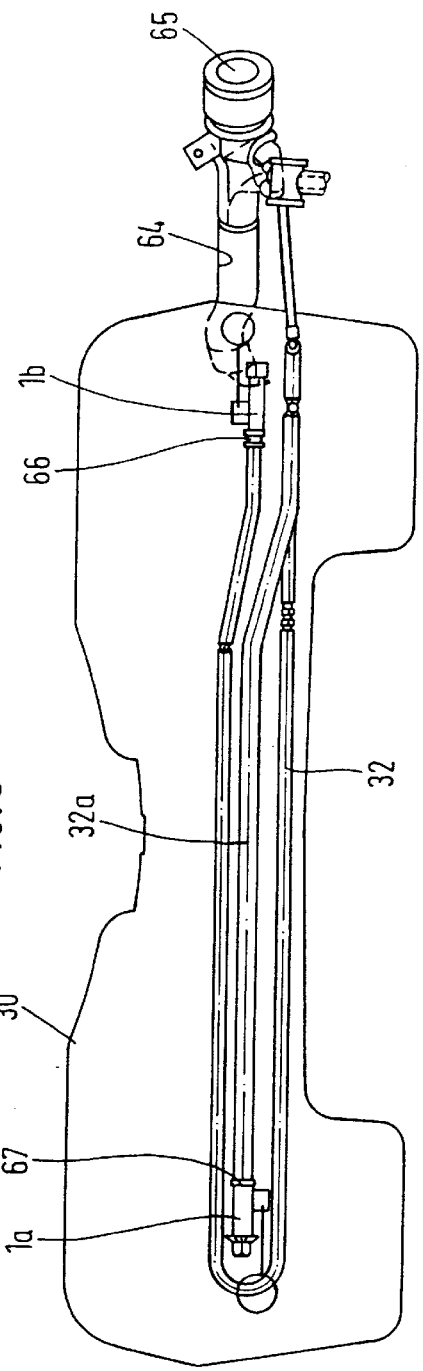

VALVE AND FUEL TANK PROVIDED WITH A VALVE FOR A MOTOR VEHICLE

BACKGROUND AND SUMMARY OF THE INVENTION

The invention relates to a valve for a fuel tank of a motor vehicle which has a float valve and a connection to atmosphere. The invention also relates to a motor vehicle fuel tank equipped with such a valve.

Vent valves for integrated expansion volumes of fuel tanks are known which limit the maximal level in the fuel tank and thus create an integrated compensation volume. These may be float valves for the refueling venting which can also be combined with rollover valves. At a maximal level in the fuel tank, the existing number of float valves are closed, so that no venting takes place in this condition.

The known floater valves may be provided with a by-pass bore so that, in the event of a volume expansion of the fuel as a result of a temperature rise in the fuel tank, a pressure compensation can take place. This has the disadvantage that, as a result of a slow topping-off during the refueling operation, the fuel compensation volume may be filled.

When the floater valves are combined with rollover valves, it is disadvantageous that, when several such valves are arranged, the leakages of the individual rollover valves will add up in the event of a rollover.

It is an object of the invention to provide a valve which permits a compact construction. It is also an object of the invention to provide a fuel tank of a motor vehicle having at least one such valve so that the fuel tank has a simplified construction.

The object indicated for the valve is achieved by a valve of the above noted type; wherein a pressure control valve is arranged on the valve, which pressure control valve opens up at a defined excess pressure in the fuel tank, wherein a refueling venting opening is constructed in the valve, wherein the refueling venting opening can be closed by a sealing plate, wherein the sealing plate has an operational venting opening, wherein the operational venting opening can be closed by a c displaceable closing part, and wherein the displacement of the closing part takes place as a function of the position of a float arranged on a float lever.

The object indicated for the fuel tank is achieved by utilizing at least one of these valves in a compensation volume integrated in a fuel tank having at least one chamber, wherein each valve comprises a venting valve chamber having a refueling venting opening, a sealing plate disposed to selectively open and close the refueling venting opening, an operational venting opening in the sealing plate, a displaceable closing part disposed to selectively open and close the operational venting opening, and a fuel level responsive float assembly operable to control the displaceable closing part as a function of fuel level in the fuel tank.

In the case of the valve according to the invention, a pressure valve and a valve operating in two stages, which is controlled by way of a float, are advantageously integrated in a single component. In the following, the valve controlled by way of the float will be called a float valve. In the case of the float valve, the refueling venting takes place in one stage and the venting in the driving operation takes place in the other stage. By means of the float valve, the fuel level in the fuel tank can advantageously be limited by way of the refueling venting. In addition, it is advantageous that a venting of the fuel tank can take place in the driving operation as well as during a side tilt of the fuel tank or of the motor vehicle.

Another advantage of the valve according to the invention consists of the fact that, when a float valve is completely closed, a pressure compensation can take place by way of the integrated pressure valve. Finally, after a complete closing of the float valve, the valve according to the invention prevents a filling of the compensation volume by a slow topping-off.

The integration of three functions in one housing results in a compact construction. The combination of several functions in one component also has the advantage that the costs of the parts and the expenditures for the preassembly and assembly are reduced.

It is also advantageous that, by means of the valve according to the invention, a variable limitation of the filling level in the fuel tank can be achieved solely by a change of the length and/or of the shape of a float lever arm to which the float is fastened. Advantageously, by adjusting the length of the float lever arm to which the float is fastened, the contact pressure force of the existing valves on their respective sealing seat as well as the opening force of the valves from the sealing seat can also be defined.

In the case of a fuel tank equipped with the valve according to the invention, a penetration of fuel into a vent line situated in the fuel tank is prevented in the event of sloshing movements of the fuel during the driving operation. As a result of the wave motion of the fuel sloshing in the fuel tank, the valve is already closed by way of the float before the fuel surge reaches the valve seat.

In the following, an embodiment of the invention will be described by means of the drawings.

BRIEF DESCRIPTION OF THE DRAWINGS

FIG. 4 is a vertical longitudinal sectional view of a fuel tank provided with two chambers, which illustrates the arrangement of two valves; and FIG. 5 is a horizontal longitudinal sectional view of the fuel tank illustrated in FIG. 4, which illustrates the connection of the valves by way of a vent line.

DETAILED DESCRIPTION OF THE DRAWINGS

Figure 1:
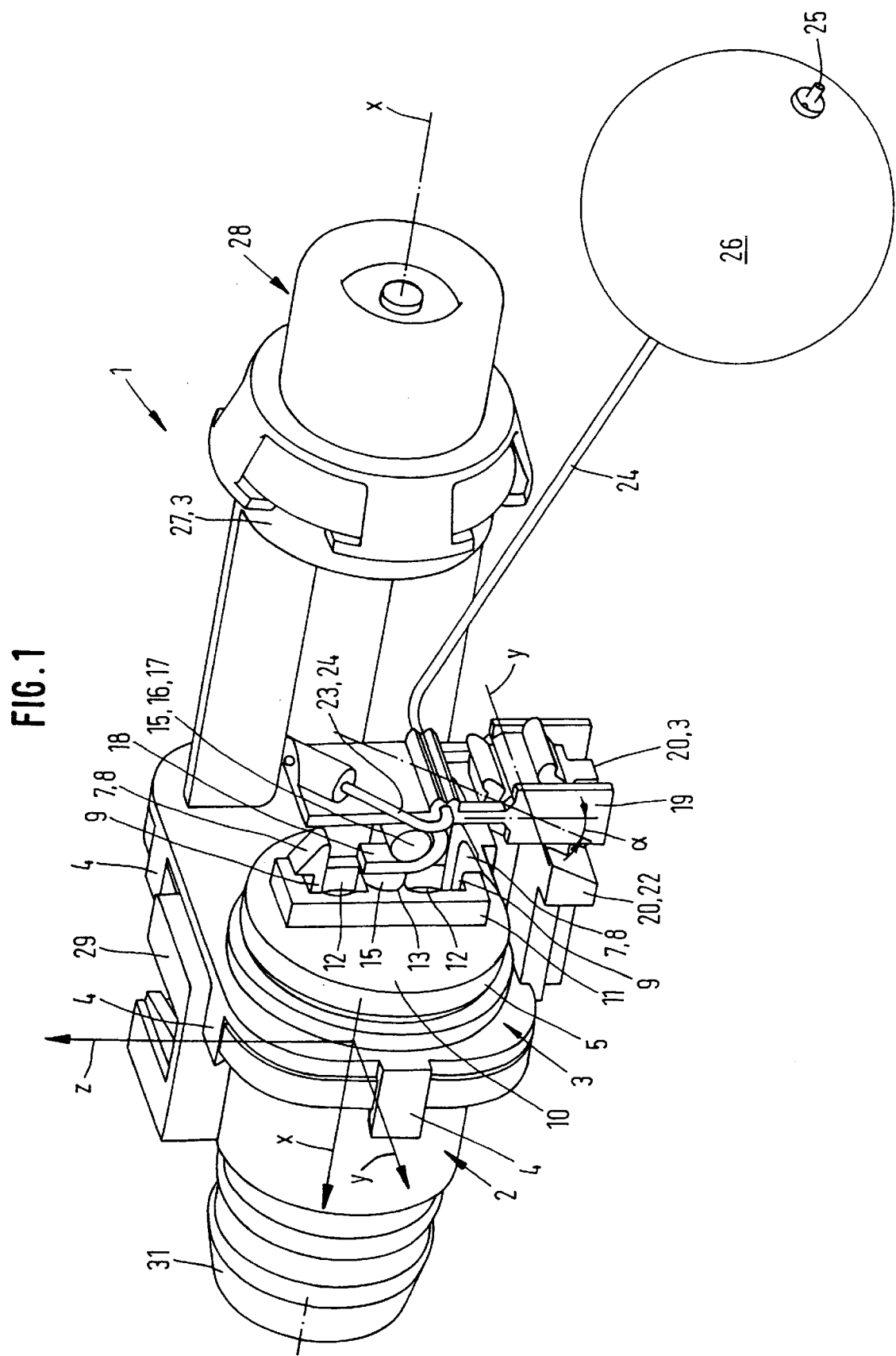
FIG. 1 is a perspective view of a valve, the openings for the refueling venting and for the operational venting being closed.
Figure 2:
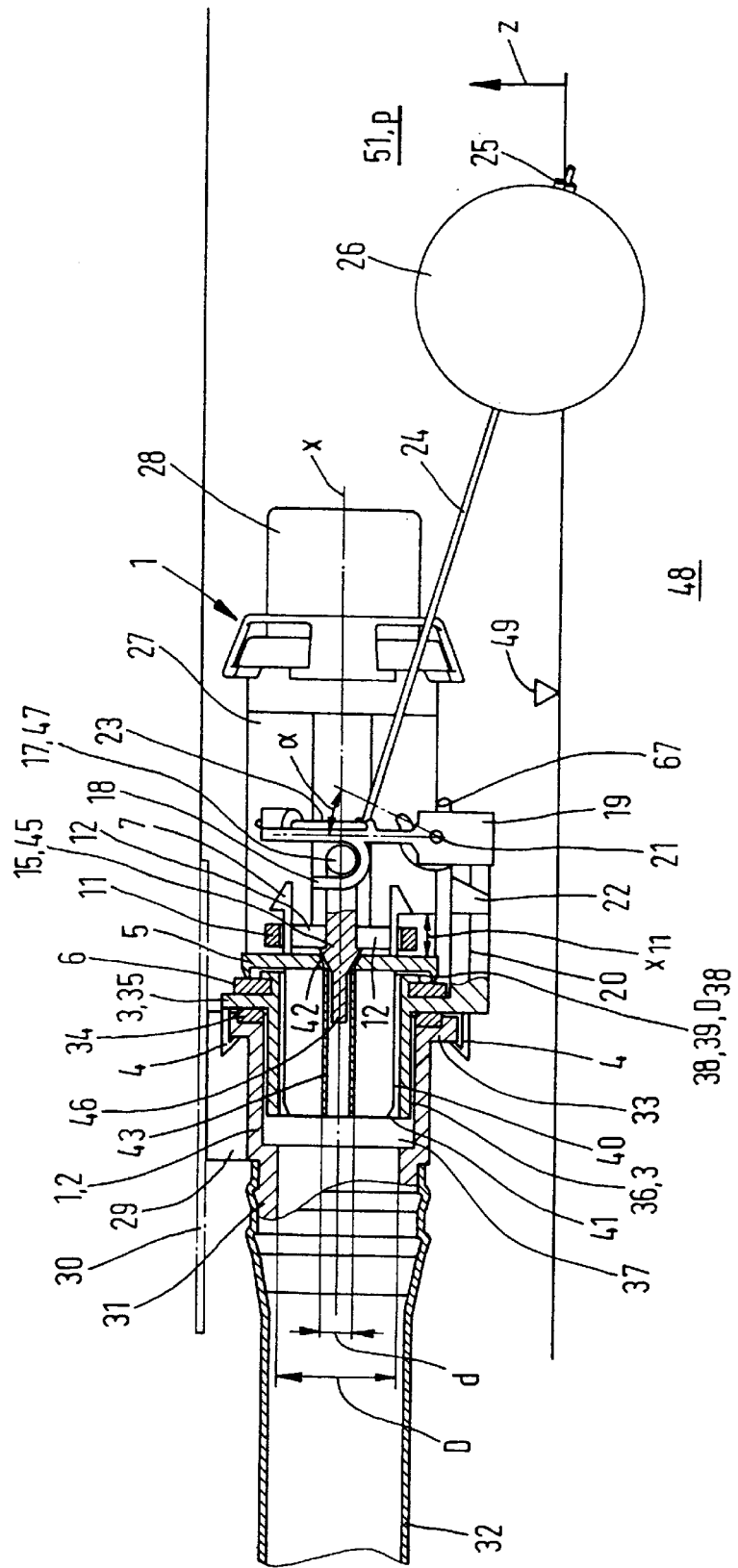
FIG. 2 is a longitudinal sectional view of the valve illustrated in FIG. 1, in which the openings for the refueling venting and for the operational venting are closed.

FIG. 1 illustrates a valve 1 with a valve chamber 2 and a cover 3 fastened by way of hooks 4 or the like to the valve chamber 2. As illustrated in FIG. 2, a valve receiving device is molded as a tube-shaped section 36 onto the cover 3. The valve receiving device 36 is visible in FIG. 2. A sealing plate 5, which can be displaced in the direction of a longitudinal axis x, is arranged on the cover 3, which sealing plate 5 rests on a seal 6 illustrated in FIGS. 2 and 3. On the sealing plate 5, two opposed webs 9 are constructed which are c each provided with a step or a hook 7 on their respective free end 8.

Between a surface 10 of the sealing plate 5 and the hook 7 of the webs 9, a rectangular plate 11 is displaceably arranged. In the plate 11, two openings 12 are provided for fastening the plate 11 on the webs 9. In the illustrated embodiment, the plate 11 is produced as an injection-molded part 15 together with the closing part 15. A closing part 15 is arranged in one piece on the plate 11 on a center web 13.

On its outer end 16, the closing part 15 has a round section 17, which extends perpendicularly to the longitudinal axis x, that is, in the illustrated embodiment, in the direction of a transverse axis y. A curved arm 18 of a swivelling lever 19 reaches around the transverse section 17 of the closing part 15. The swivelling lever 19 is held on a section 20 of the cover 3 around a swivelling axis 21 and can be swivelled about a swivelling angle α. The section 20 has a stop 22 for limiting the swivelling angle α and thus for the displaceability of the sealing plate 5 and of the closing part 15 in the direction of the longitudinal axis x. An end 23 of a float lever 24 is also fastened on the swivelling lever 19. A float 26 is fastened to the free end 25 of the float lever 24.

Figure 3:
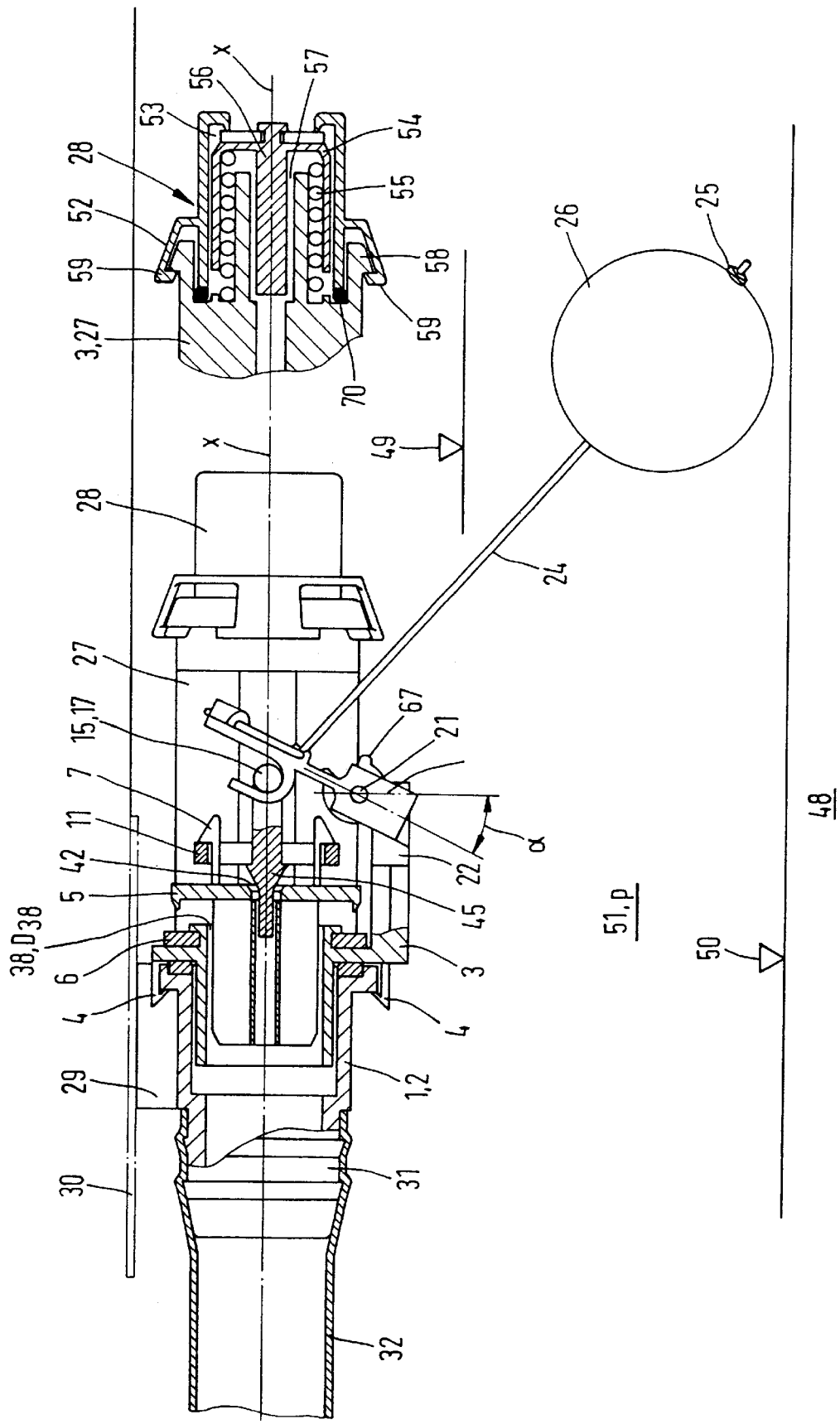
FIG. 3 is a longitudinal sectional view of the valve illustrated in FIG. 1 and of a pressure control valve arranged on the valve, the openings for the refueling venting and for the operational venting being open.

On another section 27 constructed on the cover 3, a pressure control valve 28 is arranged. A holding device 29 is also constructed on the valve chamber 2, for fastening the valve a 1 on a fuel tank 30 illustrated in the following FIGS. 2 to 5. In addition, a connection 31 for fastening a vent line 32 illustrated, for example, in FIGS. 2 and 3 is situated on the valve chamber 2.

FIG. 2 shows that a part of the valve chamber 2 is a component which is rotationally symmetrical about the longitudinal axis x. The valve chamber 2 has a flange 33 in which a seal 34 is arranged. On this seal 34, an edge or flange 35 of the cover 3 is arranged. By way of the hooks 4 of the cover 3, the edge 35 is pressed against the seal 34 by means of a predetermined contact pressure force.

The valve receiving device 36 constructed on the cover 3 projects into a hollow space 37 of the valve chamber 2. By means of the tube-shaped valve receiving device 36, the inside diameter D of a refueling venting opening 38 is defined which can be closed by the sealing plate 5 on an end 39 of the cover 3 or of the valve receiving device 36 facing the closing part 15. At the level of the end 39 of the cover 3, the seal 6 is arranged for sealing off the refueling venting opening 38. On the sealing plate 5, guides 40 are constructed, for example, in the manner of webs, which extend through an interior wall 41 of the tube-shaped valve receiving device 36 of the cover 3.

An operational venting opening 42 is formed in the center of the sealing plate. In the embodiment illustrated in FIG. 2, the sealing plate 5 is provided with an interior guide 43 which is formed by the guiding webs 40 arranged in a star-shaped manner on the sealing plate 5. An inside diameter d in the sealing plate 5 determines the cross-section of the operational venting opening 42. In the condition illustrated in FIG. 2, the operational venting opening 42 is closed by a conical section 45 of the closing part 15. A forward end 46 of the closing part 15 protrudes into the interior guide 43 and is used for guiding the closing part 15. The transverse section 17 of the closing part 15 is constructed on a rearward section 47 of the closing part 15.

The fuel 48 situated in the fuel tank 30 has reached its maximal level 49. The float 26 is in its highest position and, by way of the swivelling lever 19 and the closing part 15, which can be displaced by the swivelling lever 19, closes the refueling venting opening 38 as well as the operational venting opening 42.

In FIG. 3, the fuel 48 has sunk from the maximal level 49 to a lower lever 50 in which the float 26 no longer experiences any buoyancy and hangs freely downward into the fuel tank 30. In this case, the swivelling lever 19 has rotated by a swivelling angle a which is, for example, approximately 10 to 60°. As a result of this swivelling motion, the closing part 15 is pulled out of the operational venting opening 42. After a predefined path $x_{11}$ of the closing part 15 or of the plate 11, the plate 11 will rest against the stop 7. After a further dropping of the float 26, an opening of the refueling venting opening 38 takes place, in that the closing part 15 by way of its conical section 45 further displaces the plate 11 resting against the stop 7 and lifts the sealing plate 5 off the seal 6 or off the refueling venting opening 38.

FIG. 3 also contains a longitudinal sectional view of the pressure control valve 28. The pressure control valve 28 has an exterior chamber 52 fastened to the cover 3, which exterior chamber 52 is sealed off toward section 27 of the cover 3 by means of a sealing ring 70. An interior chamber 54 is displaceably arranged in the direction of the longitudinal axis x in a cavity 53 defined by the exterior chamber 52. By means of a spring 55, the interior chamber 54 is supported on section 27 of the cover 3. A rod-shaped section 56, which is guided in a tube-shaped section 57 of the cover section 27, is constructed in the interior chamber 54. The fastening of the exterior chamber 52 on the cover section 27 takes place by means of a snap connection. For this purpose, the cover section 27 has a flange 58, and the exterior chamber 52 has at least two hooks 59.

FIGS. 4 and 5 illustrate a fuel tank 30 with two chambers 60 and 61. The maximal filling level 49 is indicated in FIG. 4. Below the maximal level 49, a space is situated for receiving the fuel 48. The compensation volume 51 is situated above the level 49. Above the two chambers 60 and 61, one valve 1a and 1b respectively is arranged, which valves have floats 26a and 26b and are connected with one another by way of the vent lines 32 and 32a. The two valves 1a and 1b permit a venting of the fuel tank 30 also in the event of a side tilt of the fuel tank 30 or of the motor vehicle.

The vent line 32 leads through an opening 62 constructed in the fuel tank 30 into the atmosphere to a rollover valve 63. A container, which is not shown and has an activated carbon filter or the like, may be connected to the rollover valve 63.

Further, FIGS. 4 and 5 show a filler tube 64 with a fuel cap 65 arranged thereon. FIG. 5 illustrates that the valve 1b is provided at an end 66 of the vent line 32 and the valve 1a is provided at an end 67 of a side arm 32a of the vent line 32.

What is claimed is:

1. Valve for a fuel tank of a motor vehicle, having a valve chamber which is provided with a float valve, and having a connection to the atmosphere, wherein a pressure control valve is arranged on the valve, which pressure control valve opens up at a defined excess pressure in the fuel tank, wherein a refueling venting opening is constructed in the valve, wherein the refueling venting opening can be closed by a sealing plate, wherein the sealing plate has an operational venting opening, wherein the operational venting opening can be closed by a displaceable closing part, and wherein the displacement of the closing part takes place as a function of the position of a float arranged on a float lever.

2. Valve according to claim 1, wherein the position of the float is determined by a level of a fuel in a fuel tank.

3. Valve according to claim 1,
wherein devices are provided to facilitate the closing part operating the sealing plate for opening or closing the refueling venting opening.

4. Valve according to claim 2,
wherein devices are provided to facilitate the closing part operating the sealing plate for opening or closing the refueling venting opening.

5. Valve according to claim 1,
wherein a conical section is constructed on the closing part, the conical section being fastened to a displaceable plate, and
wherein at least one stop is provided on the sealing plate, which stop is used for opening the refueling venting opening.

6. Valve according to claim 1,
wherein an exterior guide is constructed on the sealing plate, which exterior guide protrudes into the valve chamber, to guide the sealing plate to be displaced only in the direction of the longitudinal axis.

7. Valve according to claim 5,
wherein an exterior guide is constructed on the sealing plate, which exterior guide protrudes into the valve chamber, to guide the sealing plate to be displaced only in the direction of the longitudinal axis.

8. Valve according to claim 6,
wherein an interior guide is formed in the exterior guide of the sealing plate, and
wherein the closing part is guided in the direction of the longitudinal axis by the interior guide.

9. Valve according to claim 6,
wherein the exterior guide of the sealing plate protrudes into a tube-shaped section of a valve cover, and
wherein an inside diameter D of the tube-shaped section of the valve cover is the inside diameter $D_{38}$ of the refueling-venting opening.

10. Valve according to claim 1,
wherein the valve chamber has a flange,
wherein a seal is arranged between the flange of the valve chamber and a flange of a valve cover, and
wherein hooks or the like are formed on the valve cover which reach around the flange of the valve chamber and fasten the valve cover to the valve chamber, and
wherein, on the respective opposite side of the flange of the valve cover, another seal is arranged which is used for sealing off the refueling venting opening when the sealing plate rests against the seal.

11. Valve according to claim 1,
wherein a section is formed on a valve cover, on which section a holding device is provided for a swivelling lever and
wherein a stop is provided on said section for limiting a swivelling angle a of the swivelling lever.

12. Valve according to claim 1,
wherein a pressure control valve section support is constructed on a valve cover, for supporting the pressure control valve.

13. Valve according to claim 11,
wherein the swivelling lever has an arm by which the closing part is held, and
wherein a float lever is fastened to the swivelling lever.

14. Valve according to claim 13,
wherein a float is fastened to a free end of the float lever.

15. Valve according to claim 1,
wherein, at a maximal filling level in a fuel tank, the venting opening for the refueling venting as well as for the operational venting is closed by the closing part and the sealing plate by way of the buoyancy caused by the float.

16. Valve according to claim 1,
wherein the valve is arranged horizontally or vertically or at an angle in the fuel tank.

17. Valve according to claim 1,
wherein a cross-section of the operational venting opening with its inside diameter d is designed such that the closing part also opens above the maximal opening pressure of the pressure control valve when the float no longer floats on the fuel.

18. Valve according to claim 1,
wherein the refueling venting opening is opened up at a low pressure p as soon as the sealing plate can be detached by way of an operational venting valve from its sealing seat on the refueling venting opening.

19. Valve according to claim 1,
wherein, when the venting openings for the refueling venting and the operational venting are closed, the pressure valve opens at a defined excess pressure $p_{28, max}$ in the fuel tank for compensating the pressure in the compensation volume.

20. Valve assembly mountable in a motor vehicle fuel tank compensation volume disposed in use above a fuel level in the fuel tank, said valve assembly comprising:
a venting valve chamber having a refueling venting opening,
a sealing plate disposed to selectively open and close the refueling venting opening,
an operational venting opening in the sealing plate,
a displaceable closing part disposed to selectively open and close the operational venting opening, and
a fuel level responsive float assembly operable to control the displaceable closing part as a function of fuel level in the fuel tank.

21. Valve assembly according to claim 20, comprising a valve cover member connected to the valve chamber;
wherein said refueling venting opening is provided in said valve cover member, and
wherein the sealing plate and closing part are supported at the valve cover member.

22. Valve assembly according to claim 20, comprising a pressure control valve operable to open in response to a predetermined excess pressure in the compensation volume.

23. Valve assembly according to claim 21, comprising a pressure control valve operable to open in response to a predetermined excess pressure in the compensation volume.

24. Valve assembly according to claim 22,
wherein said pressure control valve is supported at a valve cover member.

25. Valve assembly according to claim 20,
wherein a conical section is constructed on the closing part, the conical section being fastened to a displaceable plate, and
wherein at least one stop is provided on the sealing plate, which stop is used for opening the refueling venting opening.

26. Valve assembly according to claim 21,
wherein a conical section is constructed on the closing part, the conical section being fastened to a displaceable plate, and wherein at least one stop is provided on the sealing plate, which stop is used for opening the refueling venting opening.

27. Valve assembly according to claim 25,
wherein an exterior guide is constructed on the sealing plate, which exterior guide protrudes into the valve chamber, to guide the sealing plate to be displaced only in the direction of the longitudinal axis.

28. Valve assembly according to claim 26,
wherein an exterior guide is constructed on the sealing plate, which exterior guide protrudes into the valve chamber, to guide the sealing plate to be displaced only in the direction of the longitudinal axis.

29. Valve assembly according to claim 27,
wherein an interior guide is formed in the exterior guide of the sealing plate, and
wherein the closing part is guided in the direction of the longitudinal axis by the interior guide.

30. Valve assembly according to claim 28,
wherein an interior guide is formed in the exterior guide of the sealing plate, and
wherein the closing part is guided in the direction of the longitudinal axis by the interior guide.

31. Valve assembly according to claim 21,
wherein the exterior guide of the sealing plate protrudes into a tube shaped section of the valve cover member, and
wherein an inside diameter of the tube shaped section is an inside diameter of the refueling venting opening.

32. Valve assembly according to claim 28,
wherein the exterior guide of the sealing plate protrudes into a tube shaped section of the valve cover member, and
wherein an inside diameter of the tube shaped section is an inside diameter of the refueling venting opening.

33. Valve assembly according to claim 21,
wherein the valve chamber has a flange,
wherein a seal is arranged between the flange of the valve chamber and a flange of a valve cover member, and
wherein hooks or the like are formed on the valve cover member which reach around the flange of the valve chamber and fasten the valve cover member to the valve chamber, and
wherein, on the respective opposite side of the flange of the valve cover member, another seal is arranged which is used for sealing off the refueling venting opening when the sealing plate rests against the seal.

34. Valve assembly according to claim 28,
wherein the valve chamber has a flange,
wherein a seal is arranged between the flange of the valve chamber and a flange of a valve cover member, and
wherein hooks or the like are formed on the valve cover member which reach around the flange of the valve chamber and fasten the valve cover member to the valve chamber, and
wherein, on the respective opposite side of the flange of the valve cover member, another seal is arranged which is used for sealing off the refueling venting opening when the sealing plate rests against the seal.

35. Valve assembly according to claim 20,
wherein the valve chamber has a flange,
wherein a seal is arranged between the flange of the valve chamber and a flange of a valve cover member, and
wherein hooks or the like are formed on the valve cover member which reach around the flange of the valve chamber and fasten the valve cover member to the valve chamber, and
wherein, on the respective opposite side of the flange of the valve cover member, another seal is arranged which is used for sealing off the refueling venting opening when the sealing plate rests against the seal.

36. Valve assembly according to claim 21,
wherein said fuel level responsive float assembly is supported on the valve cover member and includes a swivelling lever, a holding device for the swivelling lever, and a stop for limiting the swivel movements of the swivelling lever.

37. Valve assembly according to claim 20,
wherein, at a maximal filling level in a fuel tank, the venting opening for the refueling venting as well as for the operational venting is closed by the closing part and the sealing plate by way of the buoyancy caused by the float assembly.

38. Valve assembly according to claim 22,
wherein a cross-section of the operational venting opening with its inside diameter d is designed such that the closing part also opens above the maximal opening pressure of the pressure control valve when the float no longer floats on the fuel.

39. Valve assembly according to claim 20,
wherein the refueling venting opening is opened up at a low pressure p as soon as the sealing plate can be detached by way of an operational venting valve from its sealing seat on the refueling venting opening.

40. Valve assembly according to claim 21,
wherein the refueling venting opening is opened up at a low pressure p as soon as the sealing plate can be detached by way of an operational venting valve from its sealing seat on the refueling venting opening.

41. Valve assembly according to claim 22,
wherein, when the venting openings for the refueling venting and the operational venting are closed, the pressure control valve opens at a defined excess pressure $p_{28,\,max}$ in the fuel tank for compensating the pressure in the compensation volume.

42. Fuel tank assembly for a motor vehicle comprising at least one fuel tank chamber with an integrated compensation volume above an in use fuel level, a valve assembly in the compensation volume for each tank chamber, a vent line leading to atmosphere connected to the respective valve assemblies, and at least one rollover valve connected to the vent line outside the fuel tank, wherein each valve assembly comprises:
a venting valve chamber having a refueling venting opening,
a sealing plate disposed to selectively open and close the refueling venting opening,
an operational venting opening in the sealing plate,
a displaceable closing part disposed to selectively open and close the operational venting opening, and
a fuel level responsive float assembly operable to control the displaceable closing part as a function of fuel level in the fuel tank.

43. Fuel tank assembly according to claim 42,
wherein a plurality of tank chambers are provided, and
wherein each tank chamber has an associated valve assembly.

44. Fuel tank assembly according to claim 42,
wherein each valve assembly comprises a valve cover member connected to the associated valve chamber,
wherein the refueling venting opening for the valve assembly is provided in said valve cover member with the sealing plate and closing part supported at said valve cover member.

45. Fuel tank assembly according to claim 44, comprising a pressure control valve operable to open in response to a predetermined excess pressure in the compensation volume.

46. Fuel tank assembly according to claim 45, wherein said pressure control valve is supported at the valve cover member.

* * * * *